No. 689,876. Patented Dec. 31, 1901.
G. H. HAMMOND.
BACK PEDALING BRAKE AND COASTER.
(Application filed Feb. 23, 1901.)
(No Model.) 2 Sheets—Sheet I.
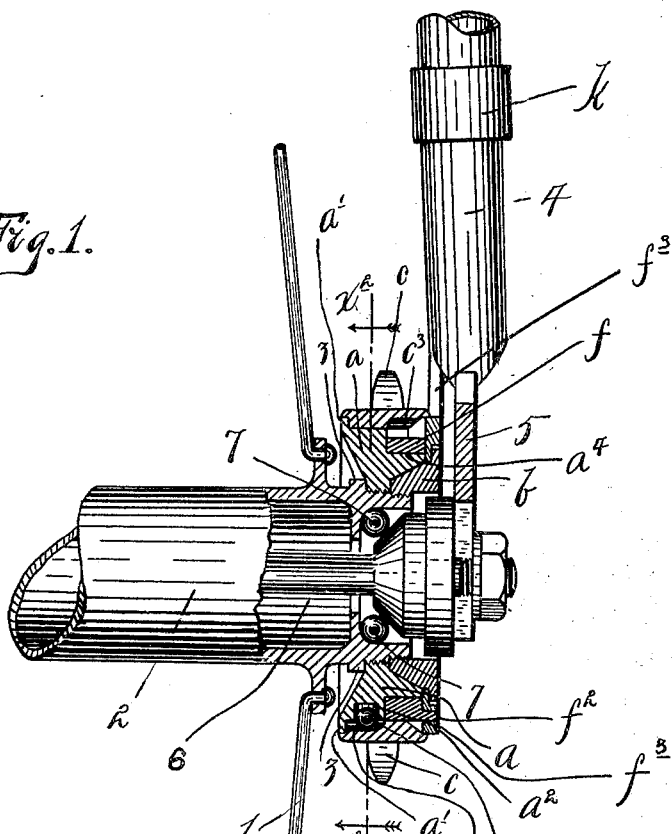
Fig.1.
Fig.2.
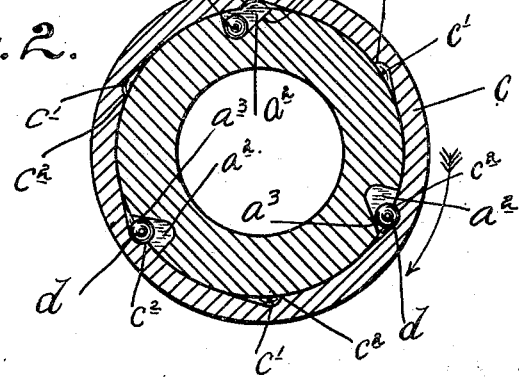
Witnesses.
C. H. Turner
Harry Kilgore
Inventor
George H. Hammond.
By his Attorneys.
Williamson & Merchant No. 689,876. Patented Dec. 31, 1901.
G. H. HAMMOND.
BACK PEDALING BRAKE AND COASTER.
(Application filed Feb. 23, 1901.)
(No Model.) 2 Sheets—Sheet 2.
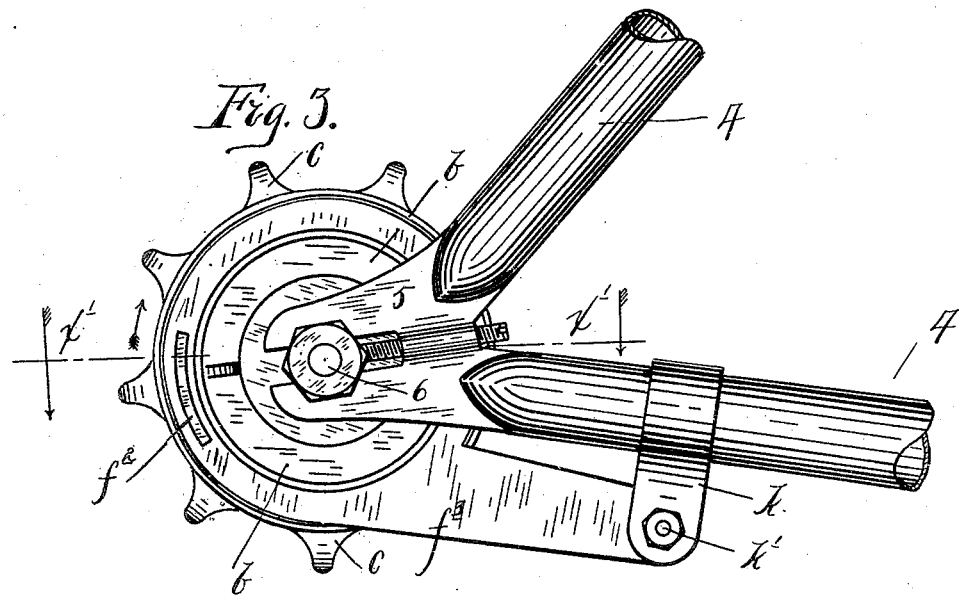
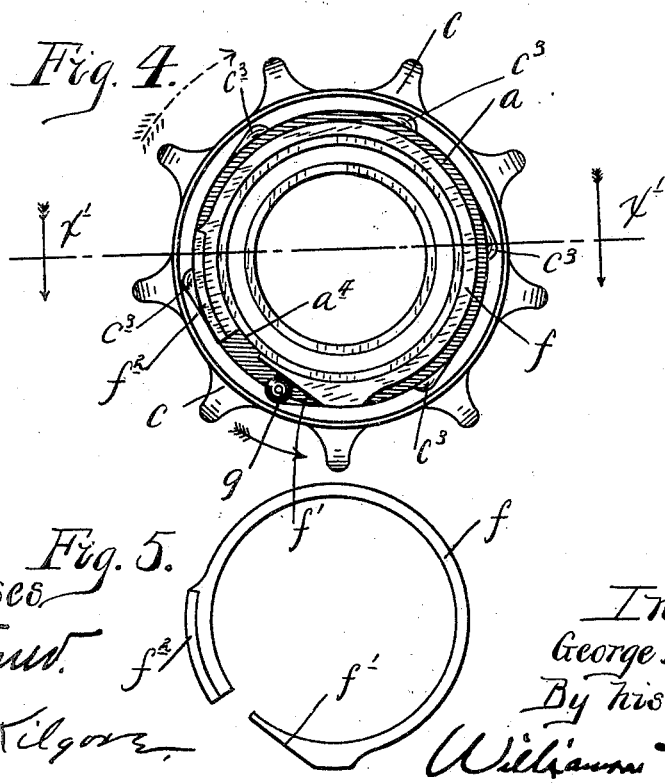
Witnesses
C. H. Turner
Harry Kilgore
Inventor
George H. Hammond
By his Attorneys
William Merchant

UNITED STATES PATENT OFFICE.

GEORGE H. HAMMOND, OF MINNEAPOLIS, MINNESOTA.

BACK-PEDALING BRAKE AND COASTER.

SPECIFICATION forming part of Letters Patent No. 689,876, dated December 31, 1901.

Application filed February 23, 1901. Serial No. 48,440. (No model.)

*To all whom it may concern:*

Be it known that I, GEORGE H. HAMMOND, a citizen of the United States, residing at Minneapolis, in the county of Hennepin and State of Minnesota, have invented certain new and useful Improvements in Back-Pedaling Brakes and Coasters; and I do hereby declare the following to be a full, clear, and exact description of the invention, such as will enable others skilled in the art to which it appertains to make and use the same.

My invention has for its object to provide a simple and efficient back-pedaling brake and coaster for bicycles; and to this end it consists of the novel devices and combinations of devices hereinafter described, and defined in the claims.

The invention is illustrated in the accompanying drawings, wherein like characters indicate like parts throughout the several views.

Figure 1 is a view, partly in plan and partly in section, on the line $x'\ x'$ of Figs. 3 and 4, showing my improved device as applied to the hub of the rear wheel of a standard or ordinary bicycle. Fig. 2 is a vertical section on the line $x^2\ x^2$ of Fig. 1. Fig. 3 is a side elevation of the parts shown in Fig. 1. Fig. 4 is a detail view, in side elevation, showing the internal mechanism of the brake and coasting attachment; and Fig. 5 is a detail view in plan showing the so-called "brake-ring" removed from working position.

Of the parts of the bicycle which are shown it is only necessary to enumerate the rear wheel 1, having an ordinary barrel-hub 2, with a flange or shoulder 3 at one end, the frame-tubes 4, which unite in the fork 5, and the rear spindle 6, secured to the frame-prongs 5 in the ordinary way and on which the hub 2 is mounted to run in the ordinary way by ball-bearings 7.

In accordance with my invention a heavy driven ring is screwed onto the end of the hub 2 and against the flange or collar 3 thereof, and an annular lock-nut $b$ is screwed onto the said hub and against the said driving-ring $a$. In the construction illustrated the driving-ring $a$ is connected to the hub by right-hand threads, while the lock-nut or ring $b$ is secured to said hub by left-hand threads, this being done for an obvious reason. The driving-sprocket $c$, which is of annular form, is mounted on the driving-ring $a$ and is held against lateral movements by a flange $a'$ on said ring $a$ and by a brake-plate presently to be noted. The driven ring $a$ is provided with peripheral pockets $a^2$, which are adapted to receive and to entirely contain driving-balls $d$. For coöperation with the pockets $a^2$ the driving-sprocket $c$ is provided with internal pockets $c'$, which are of such depth that they will receive approximately one-half of one of the balls $d$. The pocket $c'$ are gradually beveled in one direction and are formed with shoulders $c^2$ at their other extremities, which coöperate with the surfaces $a^3$ of the pockets $a^2$ in the driving action, as illustrated in Fig. 2. In a vertical plane offset from the plane of the pockets $c'$ the sprocket $c$ is provided with other pockets $c^3$, which are similar to the pockets $c'$, except that their gradual bevels extend circumferentially in reverse direction therefrom, as best shown in Fig. 4. In the plane of the pocket $c^3$ the driving-wheel $a$ is reduced to form a friction-hub $a^4$, on which is loosely mounted a split spring-ring, which I term the "brake-ring." At one end this split ring $f$ has a beveled or cam-surface $f'$ which coöperates with the pocket $c^3$ under one direction of movement of the sprocket-wheel to clamp a brake-ball $g$, as illustrated in Fig. 4. The brake-ring $f$ is non-rotary, and to prevent rotation thereof it is in this preferred construction provided with a laterally-projecting lug $f^2$ at its end which is not beveled, and this lug $f^2$ is projected through a slot in a brake-plate $f^3$. The brake-plate $f^3$, which is preferably in the form of a thin flat ring with a projecting arm, is loosely fitted on the flanged outer end of the lock-nut $b$, as best shown in Fig. 1, and the projecting arm thereof is secured to one of the frame-tubes 4 by means of a clamp $k$ and a short-nutted bolt $k'$.

The operation is probably obvious, but may be briefly stated as follows: Under the ordinary forward pedaling or driving action the driving-sprocket $c$ will of course be driven in the direction indicated by the arrows marked on Figs. 2 and 3. When thus driven, the balls $d$ will be clamped, as indicated in Fig. 2 and as already described, and the driven ring $a$ and rear traction-wheel to the hub 2, to which it is secured, will be driven in the proper direction to propel the machine forward. Under this movement of the sprocket-wheel (indicated by the dotted-line arrow on Fig. 4) the brake-ball $g$ will, as is evident, be carried away from the beveled end $f'$ of the brake-ring $f$ and will thus be rendered inoperative. When, however, the driven ring $a$ is by the traction-wheel moved forward faster than the sprocket-wheel, as will be the case either in coasting or in back-pedaling, the driving-balls $d$ will simply be forced into the pockets $a^2$ thereof and will therefore offer no resistance to such movement of the traction-wheel and driven ring. If the pedals, and consequently the sprocket-wheel $c$, are simply held stationary, the brake-ball $g$ will not more than lightly touch against the beveled cam end $f'$ of the brake-ring $f$, so that the brake will not be set at such time. If, however, the pedals and the sprocket are given a backward movement in the direction indicated by the full-line arrow marked on Fig. 4, the brake-ball $g$ will be caught by one of the pockets $c^3$ and will be forced against the cam end of the said brake-ring with more or less force, depending on the weight which the rider at such time puts upon the pedals. It is of course evident that when the brake-ball is thus forced against the beveled end of the brake-ring said ring will be pressed into frictional engagement with the brake-hub $a^4$, and thereby resist the rotary movement of the driven ring $a$ and traction-wheel.

It will of course be understood that the device above described is capable of considerable modification within the scope of my invention.

It will be understood that in a broad sense the so-called "driven ring" $a$ when applied to the wheel-hub constitutes a part of the hub, although specifically it is a detachable part.

What I claim, and desire to secure by Letters Patent of the United States, is as follows:

1. A brake and coaster attachment for cycles, comprising the driven ring $a$ having the pockets $a^2$ and hub $a^4$, the driving member mounted on said ring $a$ and provided with the reversely-acting pockets $c'$ $c^3$, the brake $f$ having the cam-surface $f'$ and arranged to bear against said hub $a^4$, the driving-balls $d$ coöperating with said pockets $c'$ and $a^2$, the brake-ball $g$ coöperating with said pockets $c^3$, and the cam-surface $f'$ of said brake, and means for anchoring the said brake to the frame of the cycle, substantially as described.

2. A brake and coaster attachment for cycles, comprising a driven ring $a$ having the pockets $a^2$ and hub $a^4$, the driving member mounted on said ring and provided with the reversely-acting pockets $c'$ $c^3$, the brake-ring $f$ having the cam end $f'$ and mounted on said hub $a^4$, the driving-balls $d$ coöperating with said pockets $c'$ and $a^2$, the brake-ball $g$ coöperating with said pocket $c^3$ and the cam end $f'$ of said brake-ring $f$, and the annular brake-plate detachably connected to said brake-ring and provided with means for anchoring the same to the cycle-frame, substantially as described.

In testimony whereof I affix my signature in presence of two witnesses.

GEORGE H. HAMMOND.

Witnesses:
F. McDaniels,
F. D. Merchant.